Patented Dec. 8, 1953

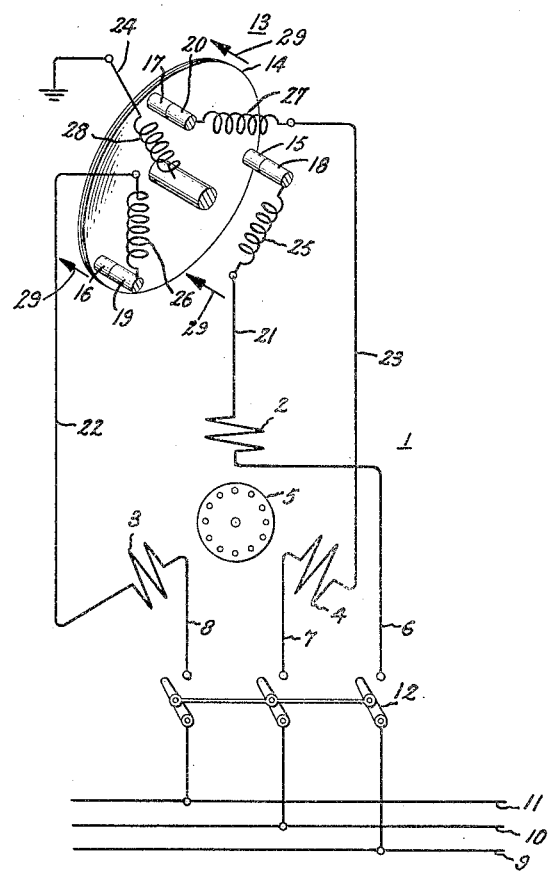

2,662,203

UNITED STATES PATENT OFFICE 2,662,203

THREE-PHASE ALTERNATING CURRENT APPARATUS WITH THERMAL PROTECTION

Richard E. Seely, Fort Wayne, Ind., assignor to General Electric Company, a corporation of New York Application March 15, 1952, Serial No. 276,825

8 Claims. (Cl. 317—13)

1

This invention relates to plural phase alternating current apparatus, especially electric motors and more particularly to three phase alternating current motors having thermal protection.

Numerous thermal overload devices have been developed and equally numerous circuits utilizing such devices have been used for the thermal protection of single phase alternating current motors. In the case of three phase alternating current motors, however, it is desirable to provide thermal protection for each phase of the motor winding independent of the other phases. More specifically, when the three phase motor windings are Y-connected, it is additionally desirable that the thermal overload device not only be responsive to excessive temperature in each of the three winding phases independently of the other phases, but also that the device open the circuits of the windings by breaking the Y of the Y connection. Furthermore, it is frequently considered desirable in the case of Y-connected three phase motors to ground the neutral and it is, therefore, additionally desirable to provide thermal protection in the grounded neutral in order to secure complete protection when one or two of the power supply lines may be opened.

It is, therefore, an object of this invention to provide an improved thermally protected, three phase alternating current motor incorporating the above enumerated features.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, three phase alternating current apparatus, such as a motor is provided having three winding sections respectively adapted to be connected to three lines of a three phase source of alternating current. A thermal switch is provided having contacts arranged to connect the winding sections in a Y-connection and to open this connection responsive to a predetermined temperature. The switch has a connection adapted to be connected to ground and auxiliary heating elements are respectively connected in series with the winding sections and with the ground connection, these heating elements being arranged to thermally affect the switch. The switch may include a snap acting bimetallic disc with the three movable contacts being mounted thereon and electrically interconnected by the disc to form the Y-connection, the connection to ground being made to the disc.

The single figure of the drawing schematically illustrates the improved thermally protected three phase alternating current motor of this invention.

Referring now to the drawing, there is shown schematically a three phase alternating current induction motor, generally identified as 1, having three field winding sections 2, 3 and 4. These windings may be positioned in a suitable stator member (not shown) and the motor may be provided with a suitable rotor, such as the squirrel cage rotor 5. The three winding sections 2, 3 and 4 are arranged with their ends 6, 7 and 8 respectively connected to lines 9, 10 and 11 of a suitable source of three phase alternating current (not shown) by means of a suitable switch 12.

In order to provide the thermal protection for the motor thus far described, a thermal switch generally identified as 13 is provided. This switch is shown as including a snap acting bimetallic disc 14 on which movable contacts 15, 16 and 17 are mounted. The movable contacts 15, 16 and 17 are electrically interconnected by the bimetallic disc 14 and cooperate with stationary contacts 18, 19 and 20 which are respectively connected to ends 21, 22 and 23 of winding sections 2, 3 and 4. The disc 14 is adapted to be connected to a suitable ground by means of a line 24. When the bimetallic snap acting disk 14 is sufficiently heated by a combination of current flowing therethrough and the affect of auxiliary heating elements, as will be hereinafter described, it snaps from its first position, as shown in the drawing, in which all of the contacts are closed, to its second position, as shown by the arrows 29, in which all of the contacts are open. It will now be readily apparent that the disc forms a Y-connection between the winding sections 2, 3 and 4 and that the Y-connection is broken when the switch is actuated to open the contacts.

In order to protect each winding section independently of the other sections, auxiliary heating elements, such as resistors 25, 26 and 27 are respectively connected in series with the ends 21, 22 and 23 of the winding sections 2, 3 and 4. These auxiliary heating elements are physically arranged to thermally affect the bimetallic disc 14. As indicated above, the use of a heating element in the neutral line is also desirable on grounded neutral systems for complete protection when one or two of the lines 9, 10 and 11 may be opened and therefore another auxiliary heating element 28 is serially connected in the grounded neutral line 24. This auxiliary heating element is also physically arranged to thermally affect the bimetallic disc 14.

It will also be readily apparent that by varying the resistivity of the bimetallic disc and by making the ratio of the disc resistance to the heater resistance relatively large it is possible to obtain very rapid tripping of the disc. This is frequently desirable in certain applications, for example in 400 cycle aircraft motors since the rotor winding will only withstand a few seconds locked rotor current with the motor stalled. A protector which requires that the disc receive all of its heat from heaters would not be satisfactory for such applications since its tripping time would be too slow under the locked rotor condition. The bimetallic disc is therefore placed at the Y of the motor so that current will pass therethrough in order that it may generate its own heat.

It will now be readily seen that protection of each of the phases of the motor winding is provided independently of the other phases and that protection in the neutral line is provided in the event of opening of one or two of the supply lines. General overload protection is, of course, provided uniformly by the phase heaters 25, 26 and 27 and the bimetallic disc 14. While a bimetallic snap-acting disc 14 has been shown, it will be readily understood that any other suitable bimetallic or heat responsive element could be used to actuate the movable contacts. It will be further understood that while the winding sections 2, 3 and 4 are shown as being connected to the stationary contacts 15, 16 and 17 with the movable contacts being interconnected by the disc 14, the movable contacts may be insulated from the disc or other heat responsive element and the windings connected thereto with the stationary contacts being interconnected to complete the Y connection.

While the thermal overload system of this invention is shown as being applied to a three phase alternating current motor, it will be readily apparent that it may be equally used to protect other alternating current apparatus having three phase windings connected in a Y, such as alternators and transformers.

While I have shown and described a particular embodiment of this invention, further modifications and improvements will occur to those skilled in the art. I desire it to be understood, therefore, that this invention is not limited to the form shown and I intend in the appended claims to cover all modifications which do not depart from the spirit and scope of this invention.

What I claim as new and desire to secure by Letters Patent of the United States is:

1. Thermally protected three phase alternating current apparatus comprising three winding sections respectively adapted to be connected to three lines of a three phase source of alternating current, a thermal switch having contacts arranged to connect said winding sections in a Y connection and to open said connection responsive to a predetermined temperature, said switch having a connection adapted to be connected to a ground, auxiliary heating elements respectively connected in series with said winding sections, and another auxiliary heating element connected in series with said ground connection, said heating elements being arranged to thermally affect said switch.

2. Thermally protected three phase alternating current apparatus comprising three winding sections respectively adapted to be connected to three lines of a three phase source of alternating current, a thermal switch having stationary contacts respectively connected to said winding sections and movable contacts cooperating with said stationary contacts to connect said winding sections in a Y-connection and to open said connection responsive to a predetermined temperature, said switch having a connection adapted to be connected to a ground, auxiliary heating elements respectively connected in series with said winding sections, and another auxiliary heating element connected in series with said ground connection, said heating elements being arranged to thermally affect said switch.

3. Thermally protected three phase alternating current apparatus comprising three winding sections respectively adapted to be connected to three lines of a three phase source of alternating current, a thermal switch having movable contacts and cooperating stationary contacts respectively connected to said winding sections, said movable contacts being connected together so as to connect said winding sections in a Y-connection and to open said connection responsive to a predetermined temperature, said movable contacts having a connection adapted to be connected to a ground, auxiliary heating elements respectively connected in series with said winding sections, and another auxiliary heating element connected in series with said ground connection, said heating elements being arranged to thermally affect said switch.

4. Thermally protected three phase alternating current apparatus comprising three winding sections respectively adapted to be connected to three lines of a three phase source of alternating current, a thermal switch having a set of three stationary contacts and a set of three cooperating movable contacts, one of said sets of contacts being respectively connected to said winding sections, the other of said sets of contacts being connected together so as to connect said winding sections in a Y-connetcion and to open said connection responsive to a predetermined temperature, said set of connected-together contacts having a connection adapted to be connected to a ground, auxiliary heating elements respectively connected in series with said winding sections, and another auxiliary heating element connected in series with said ground connection, said heating elements being arranged to thermally affect said switch.

5. Thermally protected three phase alternating current apparatus comprising three winding sections respectively adapted to be connected to three lines of a three phase source of alternating current, a thermal switch having a bimetallic element, a set of three stationary contacts, a set of three cooperating movable contacts mounted on said bimetallic element, one of said sets of contacts being respectively connected to said winding sections, the other of said sets of contacts being connected together so as to connect said winding sections in a Y connection and to open said connection responsive to a predetermined temperature, said set of connected-together contacts having a connection adapted to be connected to ground, auxiliary heating elements respectively connected in series with said winding sections, and another auxiliary heating element connected in series with said ground connection, said heating elements being arranged to thermally affect said bimetallic element.

6. Thermally protected three phase alternating current apparatus comprising three winding sections respectively adapted to be connected to three lines of a three phase source of alternating current, a thermal switch having a bimetallic element, three stationary contacts, three cooperating movable contacts mounted on said bimetallic element, said stationary contacts being respectively connected to said winding sections, said movable contacts being connected together by said bimetallic element so as to connect said winding sections in a Y-connection to open said connection responsive to a predetermined temperature, said bimetallic element having a connection adapted to be connected to a ground, auxiliary heating elements respectively connected in series with said winding sections, and another auxiliary heating element connected in series with said ground connection, said heating elements being arranged to thermally affect said bimetallic element.

7. Thermally protected three phase alternating current apparatus comprising three winding sections respectively adapted to be connected to three lines of a three phase source of alternating current, a thermal switch having a bimetallic snap acting disc, a set of three stationary contacts, a set of three cooperating movable contacts mounted on said bimetallic disc, one of said sets of contacts being respectively connected to said winding sections, the other of said sets of contacts being connected together so as to connect said winding sections in a Y connection and to open said connection responsive to a predetermined temperature, said set of connected-together contacts having a connection adapted to be connected to a ground, auxiliary heating elements respectively connected in series with said winding sections, and another auxiliary heating element connected in series with said ground connection, said heating elements being arranged to thermally affect said bimetallic disc.

8. Thermally protected three phase alternating current apparatus comprising three winding sections respectively adapted to be connected to three lines of a three phase source of alternating current, a thermal switch having a bimetallic snap-acting disc, three stationary contacts, three cooperating movable contacts mounted on said bimetallic disc, said stationary contacts being respectively connected to said winding sections, said movable contacts being connected together by said bimetallic disc so as to connect said winding sections in a Y connection and to open said connection responsive to a predetermined temperature, said bimetallic disc having a connection adapted to be connected to a ground, auxiliary heating elements respectively connected in series with said winding sections, and another auxiliary heating element connected in series with said ground connection, said heating elements being arranged to thermally affect said bimetallic disc.

RICHARD E. SEELY.

References Cited in the file of this patent

UNITED STATES PATENTS

| Number | Name | Date |
| --- | --- | --- |
| 1,422,110 | Lebovici | July 11, 1922 |
| 1,484,220 | Ihamuotila | Feb. 19, 1924 |
| 1,731,955 | Von Schaubert | Oct. 15, 1929 |
| 1,805,492 | MacMillan | May 19, 1931 |
| 1,867,379 | Ross | July 12, 1932 |
| 1,918,491 | Ross | July 18, 1933 |
| 2,312,915 | Kurtz | Mar. 2, 1943 |
| 2,398,993 | Ayers | Apr. 23, 1946 |
| 2,471,925 | Bolesky | May 31, 1949 |
| 2,490,103 | Stilwell | Dec. 6, 1949 |

FOREIGN PATENTS

| Number | Country | Date |
| --- | --- | --- |
| 93,411 | Switzerland | Mar. 1, 1922 |
| 905,543 | France | Dec. 6, 1948 |